US006829331B2

(12) United States Patent
Cullis (10) Patent No.: US 6,829,331 B2
(45) Date of Patent: Dec. 7, 2004

(54) ADDRESS BOOK FOR A VOICE MESSAGE DELIVERY METHOD AND SYSTEM

(75) Inventor: Gary Cullis, Beverly Hills, CA (US)

(73) Assignee: SoundBite Communications, Inc., Burlington, MA (US)

( * ) Notice: Subject to any disclaimer, the term of this patent is extended or adjusted under 35 U.S.C. 154(b) by 0 days.

(21) Appl. No.: 10/051,453

(22) Filed: Jan. 18, 2002

(65) Prior Publication Data

US 2002/0110225 A1 Aug. 15, 2002

Related U.S. Application Data

(63) Continuation-in-part of application No. 09/751,931, filed on Jan. 2, 2001, and a continuation-in-part of application No. 09/839,840, filed on Apr. 23, 2001.

(51) Int. Cl.[7] .............................................. H04M 1/64
(52) U.S. Cl. ........................ 379/67.1; 379/69; 379/76; 379/88.04; 379/88.17; 379/88.18; 379/88.22
(58) Field of Search ........................... 379/67.1, 69, 70, 379/76, 74, 80, 88.04, 88.17, 88.19, 88.22, 88.25, 88.11, 88.12, 88.18, 88.23, 88.26

(56) References Cited

U.S. PATENT DOCUMENTS

| | | | |
|---|---|---|---|
| 4,625,081 A | * 11/1986 | Lotito et al. .................. 379/88 |
| 4,757,525 A | * 7/1988 | Matthews et al. ............. 379/88 |
| 4,941,168 A | 7/1990 | Kelly, Jr. ..................... 379/69 |
| 4,972,461 A | 11/1990 | Brown et al. ................. 379/67 |
| 5,333,180 A | * 7/1994 | Brown et al. ................. 379/89 |
| 5,371,787 A | 12/1994 | Hamilton ..................... 379/386 |
| 5,430,792 A | 7/1995 | Jesurum et al. ........... 379/88.01 |
| 5,638,424 A | 6/1997 | Denio et al. ............. 379/88.18 |
| 5,652,789 A | * 7/1997 | Miner et al. ................ 379/201 |
| 5,724,420 A | 3/1998 | Torgrim ...................... 379/372 |
| 5,764,732 A | 6/1998 | Lubachevsky ........... 379/88.12 |
| 5,822,405 A | 10/1998 | Astarabadi .................... 379/88 |
| 5,903,627 A | 5/1999 | Shaffer et al. ............. 379/67.1 |
| 6,097,791 A | 8/2000 | Ladd et al. .............. 379/88.19 |
| 6,169,786 B1 | 1/2001 | Dunn et al. .............. 379/88.25 |
| 6,181,779 B1 | 1/2001 | Hwang ..................... 379/67.1 |
| 6,195,417 B1 | 2/2001 | Dans ........................ 379/67.1 |

(List continued on next page.)

OTHER PUBLICATIONS

Hoosain, Allan, Office Action, U.S. patent application No. 09/751,931, mailed on Apr. 14, 2003, 9 pgs.
Hoosain, Allan, Office Action, U.S. patent application No. 09/751,931, mailed on Oct. 23, 2003, 10 pgs.
Hoosain, Allan, Office Action, U.S. patent application No. 09/839,840, mailed on Sep. 5, 2002, 11 pgs.
Hoosain, Allan, Office Action, U.S. patent application No. 09/839,840, mailed on Feb. 21, 2003, 13 pgs.
Hoosain, Allan, Office Action, U.S. patent application No. 09/839,840, mailed on Jun. 18, 2003, 10 pgs.
Hoosain, Allan, Office Action, U.S. patent application No. 09/839,840, mailed on Nov. 10, 2003, 10 pgs.

*Primary Examiner*—Allan Hoosain
(74) *Attorney, Agent, or Firm*—Testa, Hurwitz & Thibeault, LLP (57) ABSTRACT

An apparatus and method for inducing a person to store telephone numbers or other contact information entered into a new voice message delivery method and system. The invention preferably operates after the person has completed a transaction, such as sending or receiving a voice message, so that the action of saving the telephone number or other contact information is convenient for the user and is less competitive with the action of sending or receiving a voice message. After a person sends or receives a voice message, the invention determines whether to offer the person an opportunity to save the telephone number or other contact information already entered into the system. The invention then allows the person to save the telephone number or other contact information in an address book associated with their account.

17 Claims, 6 Drawing Sheets

U.S. PATENT DOCUMENTS

| | | | |
|---|---|---|---|
| 6,215,858 B1 | 4/2001 | Bartholomew et al. | 379/88.17 |
| 6,226,360 B1 | 5/2001 | Goldberg et al. | 379/69 |
| 6,269,151 B1 | 7/2001 | Hanson | 379/69 |
| 6,285,745 B1 * | 9/2001 | Bartholomew et al. | 379/88.17 |
| 6,351,522 B1 * | 2/2002 | Vitikainen | 379/67.1 |
| 6,396,920 B1 | 5/2002 | Cox et al. | 379/266.02 |
| 6,424,702 B1 * | 7/2002 | Blumenschein et al. | 379/67.1 |

\* cited by examiner

ADDRESS BOOK FOR A VOICE MESSAGE DELIVERY METHOD AND SYSTEM

RELATED APPLICATIONS

The present application is a continuation-in-part of co-pending patent application Ser. No. 09/751,931, filed Jan. 2, 2001 and entitled "Voice Message Delivery Method and System," and a continuation-in-part of co-pending patent application Ser. No. 09/839,840, filed Apr. 23, 2001 and entitled "Answering Machine Detection For Voice Message Delivery Method and System," the disclosures of which are herein incorporated by reference in their entirety.

BACKGROUND OF THE INVENTION

1. Field of the Invention

The present invention relates to telecommunications, and more particularly pertains to a method and apparatus for sending recorded telephonic messages, and for enabling the storage of telephone numbers and other contact information for users of the system.

2. Description of the Prior Art

As described in the co-pending patent application entitled "Voice Message Delivery Method and System," voice messaging systems are known and used for sending and receiving messages between users that are Subscribers of the system. These prior art voice messaging systems require that a Subscriber dial into the system to (1) check to see if there are any messages in the voice mailbox, and (2) listen to the messages. These systems are not widely used among residential customers because many residential customers already use existing stand-alone answering machines and have no need or interest in maintaining a separate voice mailbox. In addition, a sender of a message cannot be sure when the Subscriber will (1) notice that a new message is present within his voice mailbox, and (2) listen to the message. Only when the Subscriber has completed both of these steps will the Subscriber receive the Sender's information.

Because of these and other limitations, the utility of existing voice messaging systems is quite low. As such, it can be appreciated that further improvements are needed in such a system.

SUMMARY OF THE INVENTION

Accordingly, it is an object of the present invention to provide an address book for a new voice messaging delivery method and system in which a telephone number or other contact information can be easily stored for later recall by a user.

It is another object of the present invention to provide an address book for a new voice messaging delivery method and system that allows a user to save and recall a telephone number or other contact information by speaking a name associated with the telephone number or other contact information.

It is another object of the present invention to provide an address book for a new voice messaging delivery method and system that allows a Sender to save a telephone number or other contact information after sending a message to a user at the telephone number or other contact information without having to re-enter the telephone number of other contact information.

It is another object of the present invention to provide an address book for a new voice messaging delivery method and system that allows a Recipient to save a telephone number or other contact information after receiving a message to a user at the telephone number or other contact information without having to re-enter the telephone number of other contact information.

It is another object of the present invention to provide an address book for a new voice messaging delivery method and system that encourages a user to add a telephone number or other contact information to an address book by prompting the user to save the telephone number or other contact information after the user has entered it while sending a voice message, or after the user has received a voice message including a reply telephone number.

It is another object of the present invention to provide an address book for a new voice messaging delivery method and system that encourages a user to add a telephone number or other contact information to an address book by prompting the user to save the telephone number or other contact information after the user has completed a transaction, such as sending or receiving a voice message, so that the action of saving the telephone number or other contact information is convenient for the user and is less competitive with the action of sending or receiving a voice message.

It is another object of the present invention to provide an address book for a new voice messaging delivery method and system that detects whether the user has entered the telephone number or other contact information over the telephone, as opposed to recalling it from the address book, and then suggests adding the telephone number or other contact information to their address book if it was entered over the telephone but does not suggest adding the telephone number or other contact information if it was recalled from the address book.

It is another object of the present invention to provide an address book for a new voice messaging delivery method and system that detects whether a telephone number or other contact information already exists within the address book and, if so, notifies the user and provides options for either canceling the address book operation or saving the telephone number or other contact information associated with a different name than the name associated with the duplicate telephone number or other contact information already in the address book.

This brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the method set forth in the following description. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other methods and systems for carrying out the objects and purposes of the present invention. It is important, therefore, that the claims be regarded as including such equivalent constructions insofar as they do not depart from the spirit and scope of the present invention.

DESCRIPTION OF THE PREFERRED EMBODIMENTS

As described in co-pending patent application entitled "Voice Message Delivery Method and System," which is incorporated herein by reference, the present invention is an address book method and system for use in a voice message delivery method and system. By address book is meant a storage area for storing one or more telephone numbers or other contact information, such as an email address or other identifier, within a centralized or distributed user account that can be accessed by the user via a communications link, such as the telephone or Internet. Preferably, the address book is a database of telephone numbers or contact information that is stored in a server accessable by a user who signs into the user's account through a telephone or over the Internet. The user, once granted access to the user account, can then save, recall, delete or otherwise manage the telephone numbers or other contact information stored within the address book.

Figure 1:
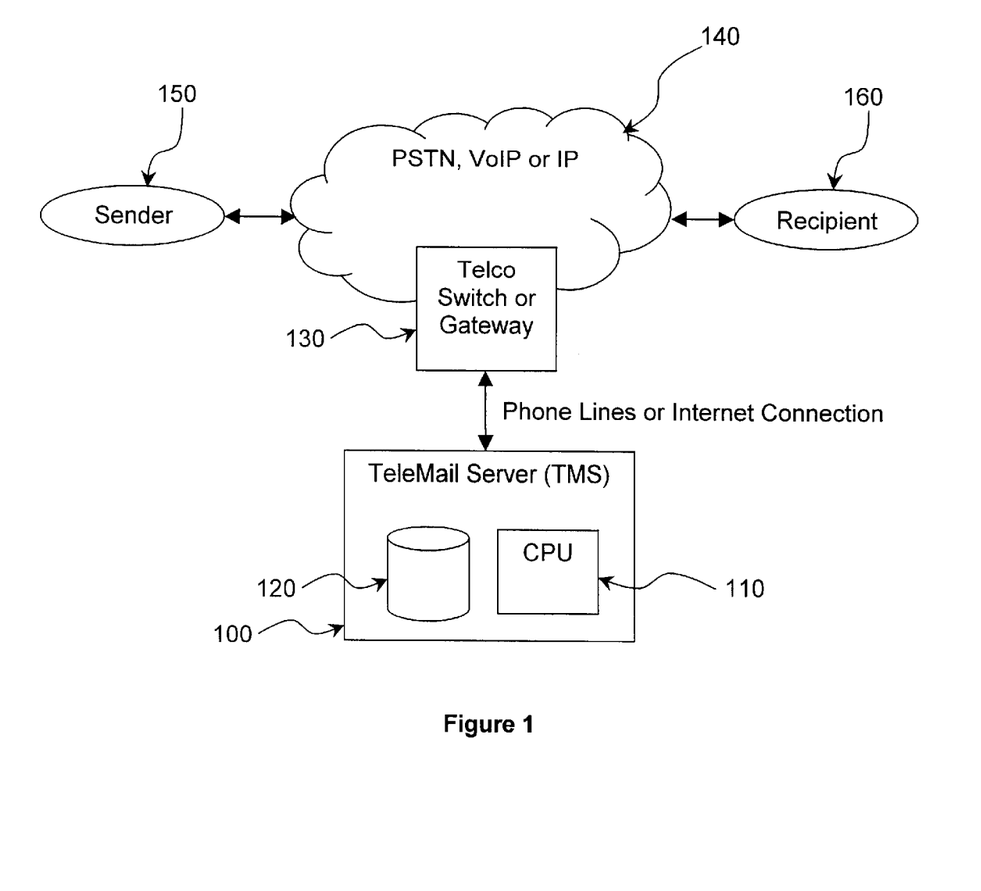
FIG. 1 shows a block diagram of the apparatus of the present invention.

As shown in FIG. 1, the voice messaging method and system of the present invention utilizes a TeleMail™ Server 100 ("TMS"), which includes a CPU 110 and data storage 120. The TMS 100 is connected to a conventionally-known telecommunications switch 130 by phone lines. The switch 130 is connected to a PSTN or VoIP cloud 140 in a manner known to those skilled in the art. Through these connections, a Sender 150 is able to dial a telephone and connect through the cloud 140 and switch 130 to the TMS 100. Similarly, a Recipient 160 can be connected via a telephone with the TMS 100. By telephone is meant any wireless or wireline device that communicates with the cloud 140 through audio and/or video means. The connections shown in FIG. 1 are exemplary only and there are other means for connecting the Sender or Recipient with the TMS that will be apparent to those skilled in the art. The TMS 100 of the present invention is preferably a computer telephony server, such as an Intel PC containing a conventionally-known computer telephony interface board and software that allows the server to be connected to a telephone line and to place and handle inbound and outbound calls.

Figure 2:
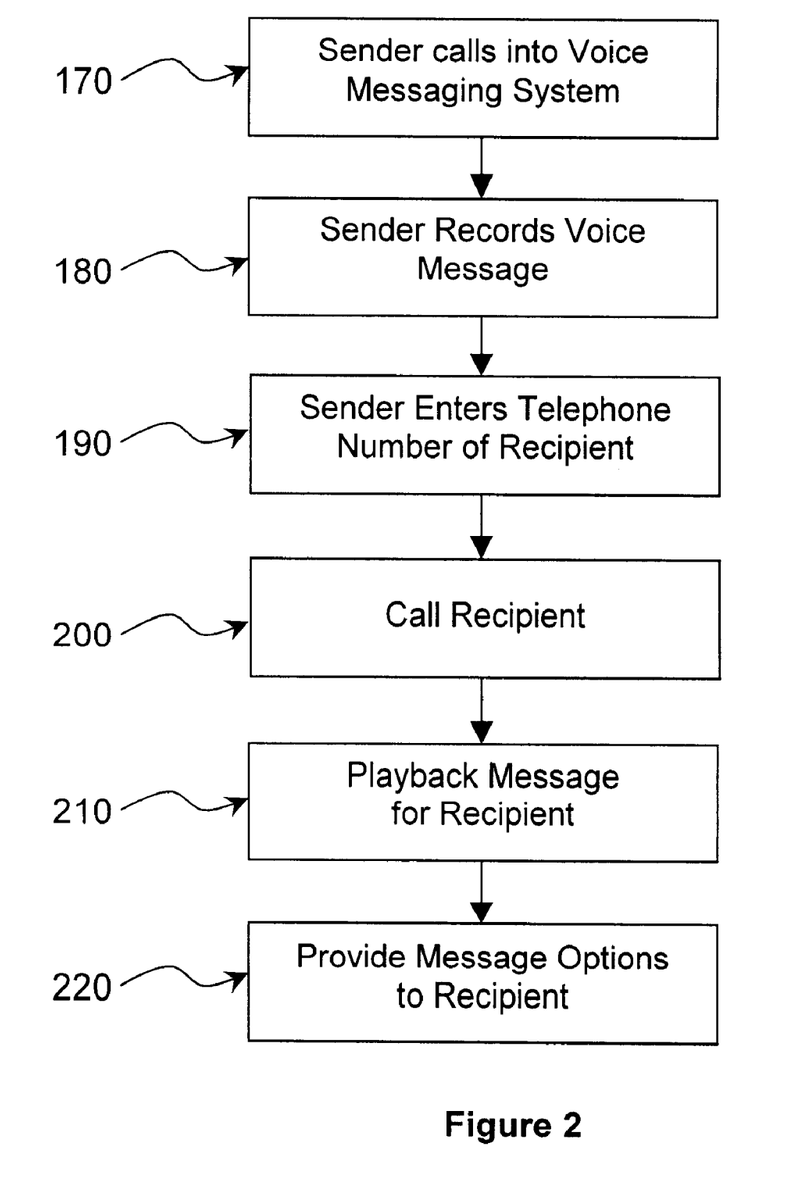
FIG. 2 shows a call flow overview illustrating the operation of the present invention.

FIG. 2 illustrates a call flow showing a function of the present invention. In use, a Sender 150 connects with the TMS, such as by dialing a telephone to place an inbound call into the TMS 100, as shown at step 170. The TMS 100 answers the call and, preferably without requiring that the Sender 150 be a Subscriber to any service, permits the Sender to record a voice message at step 180. Either before or after recording the message at step 170, the TMS 100 then prompts the Sender 150 to enter the telephone number of the Recipient 160 at step 190. The TMS 100 then places an outbound call to the Recipient 160, preferably without requiring that the Recipient be a Subscriber to any service, at step 200 to deliver the recorded message.

In delivering the message at step 200, the TMS 100 will handle a variety of situations. If the Recipient's phone is busy or there is otherwise no answer, the system will hang up and call back at a later time for a predetermined number of attempts. If, after reaching the predetermined number of attempts, the TMS 100 continues to encounter a busy signal or no answer by the Recipient 160, the TMS will return the message back to the Sender 150 by placing a call to the Sender's telephone number, alerting the Sender that the message was not delivered, and allowing the Sender to specify that the TMS 100 continue attempting to reach the Recipient 160 at the same number and/or allow the Sender to enter a different telephone number for either the same or a new Recipient. Upon notifying the Sender 150 of the failed attempt to deliver the message, the TMS 100 may also playback the message for the Sender 150 or allow the Sender to record a new message for addition to, or substitution with, the original message.

When the Recipient's phone is answered, the TMS 100 determines if the phone is answered by a person or an existing answering machine. If the phone is answered by an existing answering machine, the TMS 100 will wait for the recording session in the answering machine to begin, and play the message at step 210 into the existing answering machine for recording therein. If the Recipient 160 answers the phone, the TMS 100 will play the message for the Recipient at step 210. After playback of the message for the Recipient 160, the TMS 100 will offer the Recipient several interactive message options at step 220, including but not limited to, hearing the message again, replying to the message, forwarding the message and saving the message.

Figure 3:
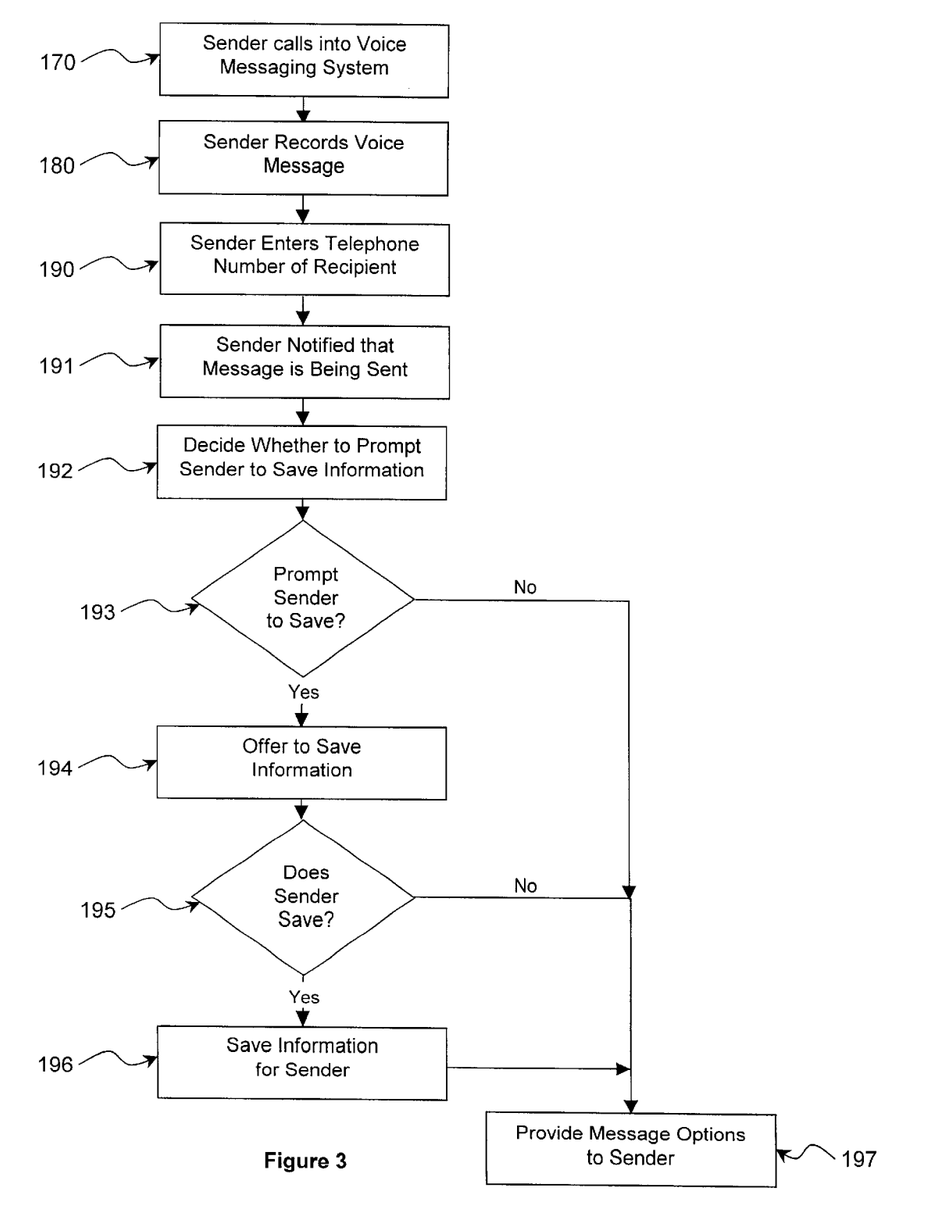
FIG. 3 shows a detailed flow chart illustrating an operation of the present invention when utilized by a Sender.

FIG. 3 illustrates the call flow of the present invention for allowing the Sender to save phone numbers or other contact information in an address book storage area of the present invention. In use, the Sender 150 calls into the TMS 100 of the Voice Messaging System at step 170. The Sender 150 then records a voice message at step 180 and enters the telephone number of the Recipient 160 at step 190. As previously described, the TMS 100 can now operate to deliver the message to the Recipient 160. Because this transaction of sending a recorded voice message to at least one recipient could now be considered complete by the Sender 150, the TMS 100 notifies the Sender that the message is being sent at step 191. Based on a number of preferred factors discussed in more detail below, the TMS 100 then decides at step 192 whether to prompt the Sender 150 to save the telephone number or other contact information in an existing address book, or additionally or alternatively, to create a new account and address book and subsequently store the telephone number or other contact information therein. If the TMS 100 decides to prompt the Sender 150 to save the telephone number or other contact information at step 193, the TMS will then play a prompt offering to save the information at step 194 that can say, for example, "You can save the telephone number you've just entered in your address book so that you can send a message in the future simply by saying this person's name. To save this person's number, press pound now." If the Sender 150 has entered more than one telephone number, such as when sending a voice message to a group of telephone numbers, the prompt at step 194 can say, for example, "You can save the telephone numbers you've entered as a group in your address book so that you can send a message to this group in the future simply by saying the group name. To save these numbers as a group, press pound now." Regardless of how the Sender 150 is encouraged to save the information at step 194, if the Sender elects to save the telephone number or numbers at step 195 by pressing the pound key, the TMS saves the telephone number or other contact information at step 196. While the TMS 100 in this example prompts the user to press the pound key to elect to save one or more telephone numbers, the TMS 100 can request any action from the Sender, such as pressing any key or speaking any utterance, to detect the Sender's intent to save the information. Additionally or alternatively, the TMS 100 may default to saving the information and not save the information if the Sender requests through similar means. To save the telephone number or numbers at step 196, the TMS 100 subsequently prompts the Sender to speak an utterance or enter a code, such as a spoken name or a series of touch tones, that are then stored by the TMS 100 in a database relative to the number or numbers in an account for the Sender for subsequent recall when sending a voice message in the future. In other words, once a telephone number or group of numbers is stored in the address book, the Sender 150 can simply speak a name or enter a code at step 190 to recall the telephone number or numbers using conventionally known voice-recognition means or systems, such as those provided by Nuance™ Communications, Incorporated of Menlo Park, Calif. or Speechworks™ of Boston, Mass.

Figure 4:
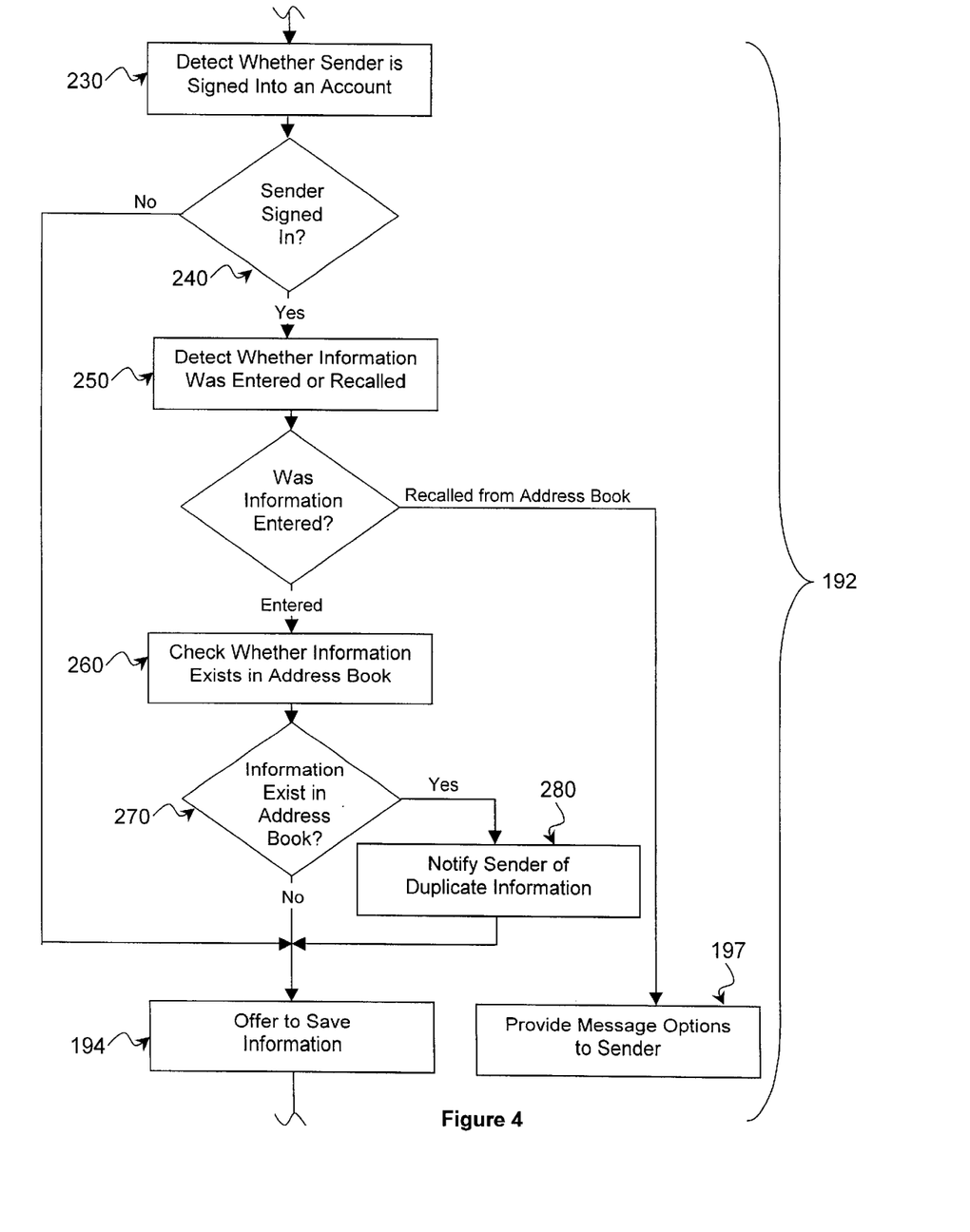
FIG. 4 shows a detailed flow chart illustrating elements of a step of the present invention when utilized by a Sender.

FIG. 4 details a preferred decision process employed by the TMS 100 at step 192 in determining whether to prompt the Sender 150 to save the telephone number or other contact information. Preferably, the TMS 100 will not offer to save the information at step 192 if the Sender doesn't need to save the information, such as when the information is already in the Sender's address book, for example. Referring to FIG. 4, the TMS 100 at step 230 detects whether the Sender 150 is signed into an account. By "signed in" is meant that the TMS 100 has or will allow the Sender to access an account or data storage area on the TMS or elsewhere over the telephone or through the Internet that is preferably specific to the Sender or the access device (i.e. telephone or Internet access point) but may also be a general account open to other Senders as well. If the Sender is not signed in, the TMS 100 preferably offers to save the information at step 194 since it is likely that the information does not exist in the Sender's address book or that the Sender does not have an address book or account. If the Sender is signed in to an account at step 240, however, the TMS 100 will detect whether the telephone number or other contact information was either entered over the telephone (or Internet) or recalled from an address book of the Sender's account. If the information was recalled, the TMS 100 preferably jumps to step 197 and simply provides the message options to the Sender 150. On the other hand, if the telephone number or other contact information was entered over the telephone or Internet connection, the TMS 100 at step 260 may also check to see whether the information exists in the Sender's address book. In checking to see if the information exists in the address book, the TMS 100 may compare any of several pieces of data. For example, the TMS 100 can compare a telephone number or group of numbers to detect whether the same telephone or a similar group of telephone numbers exists. (By "similar group of telephone numbers" is meant a group of telephone numbers in which similar people would be reached regardless of variances such as the listing order of the numbers, or the presence or absence or optional area codes or extensions, for example.) Moreover, if the Sender was not signed in at step 194 and subsequently elects to save the information at step 195, the TMS 100 can also perform the comparison described herein at step 260. If a similar telephone number or group of numbers exists at 270, the TMS 100 can notify the Sender at step 280 by stating for example, "The number you've entered already exists in your address book as [spoken name]." The TMS 100 then preferably continues to step 194 to offer to save the information for the Sender 150 so that a record for a different person at the same telephone number or group of numbers can be created in the address book, if so desired by the Sender. If at any time the TMS 100 does not offer to save the telephone number or other contact information to the Sender 150, or if the Sender decides not to save, then the TMS can finalize the call with any other prompt, such as by playing message options to the Sender at step 197, for example.

When the TMS 100 offers to save the telephone numbers or other contact information at step 194, the TMS will sign in a Sender 150 who was not signed in at step 240 described above. To sign in the Sender, the TMS 100 can offer to sign them into an existing account or create a new account by prompting them for an account name or number, preferably their own name or telephone number, and a password, such as a name, number, voice print, or other identifying indicia specific to the individual or related thereto. Once the Sender 150 is signed in, and after having elected to save the telephone numbers or other contact information, the TMS 100 can also perform steps 260–280 as applicable to compare whether the information was already in the Sender's address book.

In this manner, the TMS 100 allows a Sender, whether signed in or not, to save the telephone numbers or other contact information entered during a transaction of sending a voice message within an address book associated with the Sender's account. The preferred embodiment of the present invention increases the likelihood that a Sender will save the information because the action of saving is offered after the voice message is sent. Further, the action of saving of the present invention does not compete with the Sender's goal of sending a message but is instead synergistic with the goal of sending a message because the method leverages the fact that the Sender has already entered one or more telephone numbers and, therefore, does not require the Sender to re-enter such number or numbers to create an address book entry.

Figure 5:
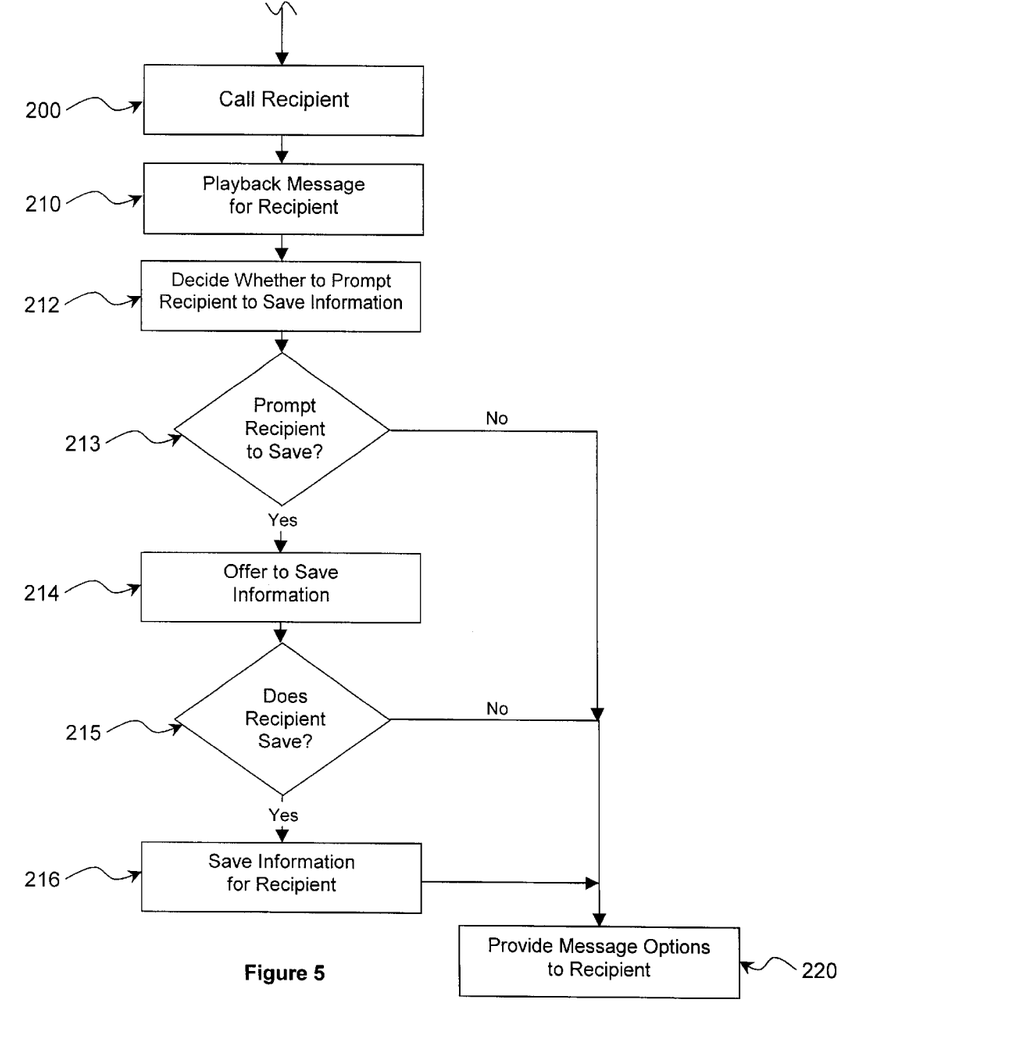
FIG. 5 shows a detailed flow chart illustrating a portion of the present invention when utilized by a Recipient.

Turning now to FIG. 5, the present invention may also include the ability to save telephone numbers or other contact information for the Recipient 160 of a voice message. As described above, once a Sender 150 sends a voice message, the TMS 100 calls the Recipient's telephone number at step 200. When the Recipient's phone is answered, the TMS 100 determines if the phone is answered by a person or an existing answering machine. If the phone is answered by an existing answering machine, the TMS 100 will wait for the recording session in the answering machine to begin, and play the message at step 210 into the existing answering machine for recording therein.

At step 212 in FIG. 5, the TMS 100 then decides whether to prompt the Recipient 160 to save the contact information of the Sender, which could be entered during the sending process as a reply number, or to save the contact information of a group of numbers entered by the Sender when sending the voice message to a group of telephone numbers. If the Recipient's phone is answered by an existing answering machine, the TMS 100 preferably does not prompt the Recipient to save at step 213 and instead simply ends the call or plays a short notice before doing so (such as "This call is now complete"). If the Recipient 160 answers the phone, however, the TMS 100 will play the message for the Recipient at step 210 and then decide whether to prompt the Recipient to save the contact information (either the reply number of the Sender or the telephone numbers of a group including the Recipient) at steps 212 and 213. If the TMS 100 decides to prompt the Recipient 160 at 213, then the TMS will play a prompt offering to save the information at step 214 that can say, for example, "You can save the telephone number of the person who sent you this message so that you can send them a message in the future simply by saying this person's name. To save this person's number, press pound now." If the Recipient 160 has received a voice message that was sent to more than one person or telephone number, such as when receiving a voice message sent to a group of telephone numbers, the prompt at step 214 can say, for example, "You've received this message as part of a group mailing. You can save the telephone number of the group in your address book so that you can send a message to this group in the future simply by saying the group name. To save these numbers as a group, press pound now." Regardless of how the Recipient 160 is encouraged to save the information at step 214, if the Recipient elects to save the telephone number or numbers at step 215 by pressing the pound key the TMS saves the telephone number or other contact information at step 216. While the TMS 100 in this example prompts the Recipient 160 to press the pound key to elect to save one or more telephone numbers, the TMS 100 can request any action from the Recipient, such as pressing any key or speaking any utterance, to detect the Recipient's intention to save the information. Additionally or alternatively, the TMS 100 may default to saving the information and not save the information if the Recipient requests through similar means. To save the telephone number or numbers at step 216, the TMS 100 subsequently prompts the Recipient to speak an utterance or enter a code, such as a spoken name or a series of touch tones, that are then stored by the TMS 100 in a database relative to the number or numbers in an account of the Recipient for subsequent recall when sending a voice message in the future, as described above for the Sender 150.

Figure 6:
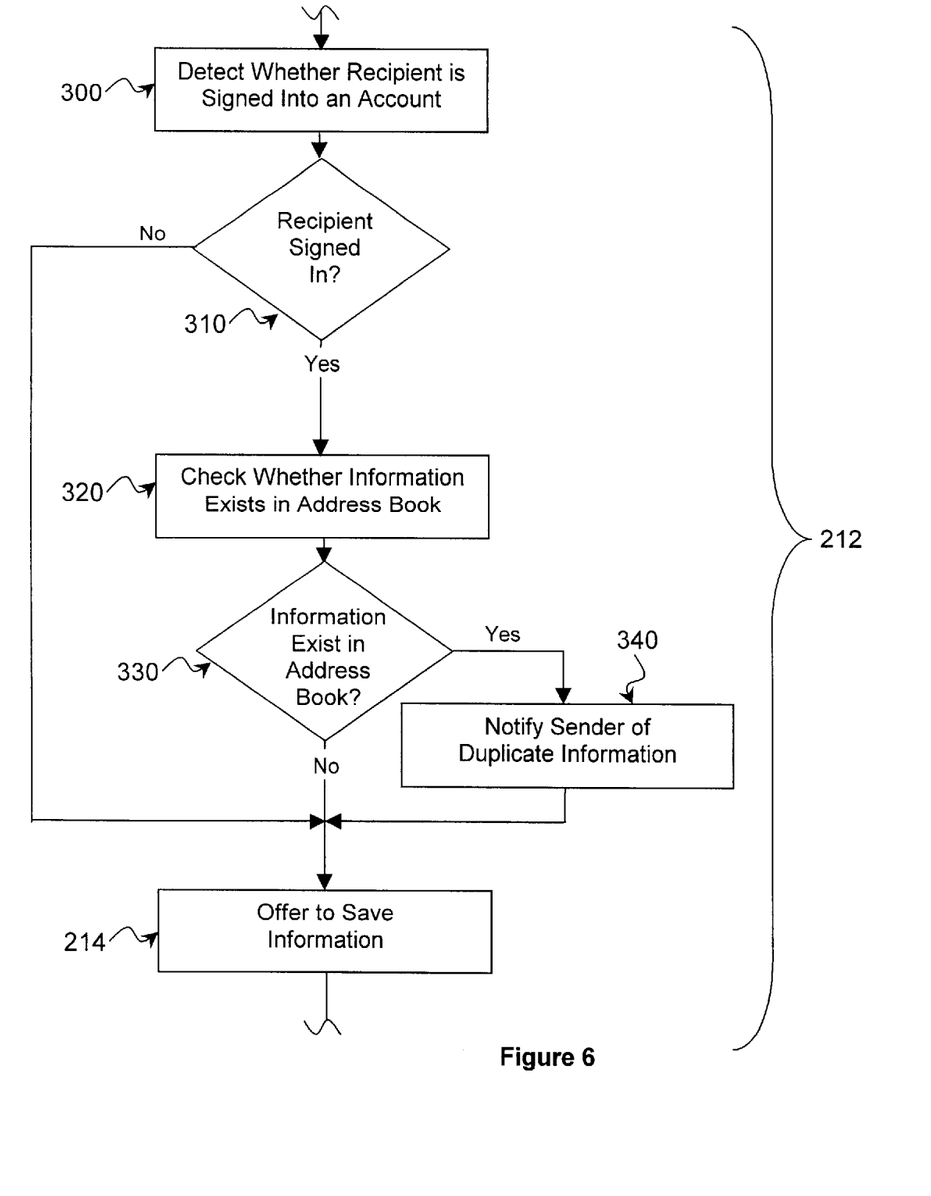
FIG. 6 shows a detailed flow chart illustrating elements of a step of the present invention when utilized by a Recipient.

FIG. 6 details a preferred decision process employed by the TMS 100 at step 212 in determining whether to prompt the Recipient 160 to save the telephone number or other contact information. Preferably, the TMS 100 will not offer to save the information at step 212 if the Recipient 160 doesn't need to save the information, such as when the information is already in the Recipient's address book, for example. Referring to FIG. 6, the TMS 100 at step 300 detects whether the Recipient 160 is signed into an account, which can occur automatically by the TMS 100 based on the Recipient's automatic numbering information (ANI) when the Recipient gives permission to automatically sign in to the Recipient's account whenever the TMS 100 is connected to the Recipient's telephone or Internet connection. By "signed in" is meant that the TMS 100 has or will allow the Recipient 160 to access an account or data storage area on the TMS or elsewhere over the telephone or through the Internet that is preferably specific to the Recipient or the access device (i.e. telephone or Internet access point) but may also be a general account open to other Senders 150 or Recipients as well. If the Recipient 160 is not signed in, the TMS 100 preferably offers to save the information at steps 213 and 214 since it is likely that the information does not exist in the Recipient's address book or that the Recipient does not have an address book or account yet. If the Recipient is signed in to an account at step 310, however, the TMS 100 at step 320 may also check to see whether the information exists in the Recipient's address book. In checking to see if the information exists in the address book, the TMS 100 may compare any of several pieces of data. For example, the TMS 100 can compare a telephone number or group of numbers to detect whether the same telephone or a similar group of telephone numbers exists. (By "similar group of telephone numbers" is meant a group of telephone numbers in which similar people would be reached regardless of items such as the listing order of the numbers, the presence or absence or optional area codes or extensions, for example.) Moreover, if the Recipient was not signed in at step 310 and subsequently elects to save the information, the TMS 100 can also perform the comparison described herein at step 320 before proceeding to save the information for the Recipient 160 at step 216. If a similar telephone number or group of numbers exists at 330, the TMS 100 can notify the Recipient 160 at step 340 by stating for example, "This person's number already exists in your address book as [spoken name]," or "This group already exists in your address book as [group name]." The TMS 100 then preferably continues to step 214 to offer to save the information for the Recipient 160 so that a record for a different person at the same telephone number (such as a spouse) or group of numbers (such as for overlapping groups) can be created in the address book, if so desired by the Recipient. If at any time the TMS 100 does not offer to save the telephone number or other contact information to the Recipient 160, or the Recipient elects not to save the information, then the TMS can end the call with any other prompt, such as by playing message options to the Recipient at step 220, for example.

When the TMS 100 offers to save the telephone numbers or other contact information at step 214, and the Recipient 160 elects to save at step 215, the TMS at step 216 will sign in a Recipient 160 who was not signed in at step 310 described above. To sign in the Recipient 160, the TMS 100 can offer to sign them into an existing account or create a new account in a manner similar to that described above for the Sender 150. Once the Recipient 160 is signed in, and after having elected to save the telephone numbers or other contact information, the TMS 100 can also perform steps 320–340 as applicable to compare whether the information was already in the Recipient's address book. In this manner, the TMS 100 allows a Recipient, whether signed in or not, to save the telephone numbers or other contact information associated with a Sender's message within an address book associated with the Recipient's account. The preferred embodiment of the present invention increases the likelihood that a Recipient will save the information because the action of saving is offered after the voice message is received. Further, the action of saving the contact information of the present invention does not compete with the Recipient's goal of hearing a message but is instead synergistic with the goal of hearing a message because the method leverages the fact that the Sender has already entered the Sender's telephone number or all the numbers of a group, and, therefore, the Recipient does not have to re-enter such number or numbers to create an address book entry.

As to a further discussion of the manner of usage and operation of the present invention, the same should be apparent from the above description. Accordingly, no further discussion relating to the manner of usage and operation will be provided.

While the present invention has been described as utilizing the telephone system to connect the Sender and Recipient with the TMS 100, the invention may also utilize any other communications medium now known or later developed outside of the public telephone network and systems. For example, the Sender and Recipient could either or both be connected to the TMS 100 by wireless devices, Internet connections, or other communication means, to enable the sending and receiving of audio and/or video messages.

With respect to the above description then, it is to be realized that the optimum dimensional relationships for the parts of the invention, to include variations in form, function and manner of operation, implementation and use, are deemed readily apparent and obvious to one skilled in the art, and all equivalent relationships to those described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An address book method for a voice message delivery system, comprising:
   (a) receiving an inbound call from a Sender;
   (b) recording an audio message from the Sender intended for at least one Recipient;
   (c) receiving from the Sender a telephone number for each of the at least one Recipients;
   (d) sending the recorded audio message to the at least one Recipient and
   (e) after sending the recorded audio message:
      (e1) deciding whether to prompt the Sender to save the at least one telephone number;
      (e2) prompting the Sender to save the at least one telephone number when it is decided to prompt the Sender to save the at least one telephone number; and
      (e3) saving, without again receiving from the Sender the at least one telephone numbe,r the at least one telephone number in an account for the Sender if when the Sender elects to save the at least one telephone number.

2. The address book method of claim 1, wherein deciding whether to prompt the Sender to save the at least one telephone number comprises determining whether the at least one telephone number was entered over a telephone as opposed to having been recalled from an address book of the account of the Sender, and further comprising deciding to prompt the Sender to save the at least one telephone number when the at least one telephone number was entered over the telephone.

3. The address book method of claim 1, wherein deciding whether to prompt the Sender to save the at least one telephone number comprises determining whether the at least one telephone number exists within an address book of the account of the Sender, and further comprising deciding to prompt the Sender to save the at least one telephone number when the at least one telephone number does not exist within the account of the Sender.

4. The address book method of claim 1, wherein deciding whether to prompt the Sender to save the at least one telephone number comprises determining, in the case of a single telephone number, whether the single telephone number exists in an address book of the account of the Sender, and, in the case of multiple telephone numbers, whether the multiple telephone numbers exist in the address book of the account of the Sender regardless of a listing order of the multiple telephone numbers, and further comprising deciding to prompt the Sender to save the at least one telephone number when, in the case of the single telephone number, the single telephone number exists in the address book of the account of the Sender, and, in the case of the multiple telephone numbers, the multiple telephone numbers exist in the address book of the account of the Sender regardless of the listing order of the multiple telephone numbers.

5. The address book method of claim 1, wherein saving the at least one telephone number in the account for the Sender comprises:
   (e3a) prompting the Sender to speak an utterance;
   (e3b) recording the utterance; and
   (e3c) storing the utterance relative to the at least one telephone number in the account for the Sender, whereby the Sender can recall the at least one telephone number in the future by saying the utterance.

6. The address book method of claim 1, wherein deciding whether to prompt the Sender to save the at least one telephone number comprises determining whether the Sender is signed into the account of the Sender, and further comprising deciding to prompt the Sender to save the at least one telephone number when the Sender is not signed into the account of the Sender.

7. An address book method for a voice message delivery system comprising:
   (a) providing a voice message server configured to:
      (a1) receive an inbound call from a Sender;
      (a2) record an audio message from the Sender intended for at least one Recipient;
      (a3) receive from the Sender a telephone number for each of the at least one Recipients;
      (a4) receive a reply telephone number for the Sender;
      (a5) place an outbound call to a telephone line of the at least one Recipient for the purpose of playing the recorded audio message to the at least one Recipient;
      (a6) determine whether the telephone line of the at least one Recipient is answered by a person or an answering machine; and
      (a7) play the recorded audio message to the at least one Recipient;
   (b) deciding, at the voice message server, whether to prompt the at least one Recipient to save the reply telephone number;
   (c) prompting, by the voice message server, the at least one Recipient to save the reply telephone number when it is decided to prompt the at least one Recipient to save the reply telephone number; and
   (d) saving, at the voice message server, the reply telephone number in an account for the at least one Recipient when the at least one Recipient elects to save the reply telephone number.

8. The address book method of claim 7, wherein;
   deciding whether to prompt the at least one Recipient to save the reply telephone number comprises determining if whether the at least one Recipient is signed into the account of the at least one Recipient, and further comprising deciding to prompt the at least one Recipient to save the reply telephone number when the at least one Recipient is not signed into the account of the at least one Recipient.

9. The address book method of claim 7, wherein;
   deciding whether to prompt the at least one Recipient to save the reply telephone number comprises determining whether the reply telephone number exists within an address book of the account of the at least one Recipient, and further comprising deciding to prompt the at least one Recipient to save the reply telephone number when the reply telephone number does not exist within the account of the at least one Recipient.

10. The address book method of claim 7, wherein saving the reply telephone number in the account for the at least one Recipient comprises:
   (d1) prompting the at least one Recipient to speak an utterance;
   (d2) recording the utterance; and
   (d3) storing the utterance relative to the reply telephone number in the account for the at least one Recipient, whereby the at least one Recipient can recall the reply telephone number in the future by saying the utterance.

11. The address book method of claim 7, wherein the reply telephone number is saved in the account for the at least one Recipient without receiving the reply telephone number from the at least one Recipient.

12. An address book method for a voice message delivery system comprising:
   (a) providing a voice message server configured to:
      (a1) receive an inbound call from a Sender;
      (a2) record an audio message from the Sender intended for at least one Recipient;
      (a3) receive from the Sender a telephone number for each of the at least one Recipients;
      (a4) place an outbound call to a telephone line of the at least one Recipient for the purpose of playing the recorded audio message to the at least one Recipient;
      (a5) determine whether the telephone line of the at least one Recipient is answered by a person or an answering machine; and
      (a6) play the recorded audio message to the at least one Recipient;
   (b) deciding, at the voice message server, whether to prompt the at least one Recipient to save the at least one telephone number;
   (c) prompting, by the voice message server, the at least one Recipient to save the at least one telephone number when it is decided to prompt the at least one Recipient to save the at least one telephone number; and
   (d) saving, at the voice message server, the at least one telephone number in an account for the at least one Recipient when the at least one Recipient elects to save the at least one telephone number.

13. The address book method of claim 12, wherein deciding whether to prompt the at least one Recipient to save the at least one telephone number comprises determining whether the at least one Recipient is signed into the account of the at least one Recipient, and further comprising deciding to prompt the at least one Recipient to save the at least one telephone number when the at least one Recipient is not signed into the account of the at least one Recipient.

14. The address book method of claim 12, wherein deciding whether to prompt the at least one Recipient to save the at least one telephone number comprises determining whether the at least one telephone number exists within an address book of the account of the at least one Recipient, and further comprising deciding to prompt the at least one Recipient to save the at least one telephone number when the at least one telephone number does not exist within the account of the at least one Recipient.

15. The address book method of claim 12, wherein saving the at least one telephone number in the account for the at least one Recipient comprises:
   (d1) prompting the at least one Recipient to speak an utterance;
   (d2) recording the utterance; and
   (d3) storing the utterance relative to the at least one telephone number in the account for the at least one Recipient, whereby the at least one Recipient can recall the at least one telephone number in the future by saying the utterance.

16. The address book method of claim 12, wherein the at least one telephone number is saved in the account for the at least one Recipient without receiving the at least one telephone number from the at least one Recipient.

17. An address book method for a voice message delivery system, comprising:
   (a) receiving an inbound call from a Sender;
   (b) recording an audio message from the Sender intended for at least one Recipient;
   (c) receiving from the Sender a telephone number for each of the at least one Recipients;
   (d) sending the recorded audio message to the at least one Recipient;
   (e) deciding whether to prompt the Sender to save the at least one telephone number, without receiving a specific request from the Sender for the prompt, by determining whether the Sender is signed into an account of the Sender;
   (f) deciding to prompt the Sender to save the at least one telephone number when the Sender is not signed into the account of the Sender;
   (g) prompting the Sender to save the at least one telephone number when it is decided to prompt the Sender to save the at least one telephone number; and
   (h) saving the at least one telephone number in the account for the Sender when the Sender elects to save the at least one telephone number, whereby the saving of the at least one telephone number leverages the fact that the Sender has previously entered the at least one telephone number and does not compete with a Sender's goal of sending the audio message.

* * * * *